(12) United States Patent
Liao et al.

(10) Patent No.: US 6,496,472 B1
(45) Date of Patent: Dec. 17, 2002

(54) TURNTABLE RUNOUT COMPENSATION SYSTEM FOR AN OPTICAL DISK DRIVE

(75) Inventors: Cheng-Yao Liao, Taipei (TW); Jui-Nan Chuang, Taipei (TW); Ta Hsiang Wang, Taipei (TW); Tzu Nan Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 0 days.

(21) Appl. No.: 09/534,613

(22) Filed: Mar. 27, 2000

(51) Int. Cl.$^7$ ............................................... G11B 23/00
(52) U.S. Cl. ....................................................... 369/264
(58) Field of Search ......................................... 369/264

(56) References Cited

U.S. PATENT DOCUMENTS 4,370,371 A  *  1/1983  Nakahira ..................... 264/153

FOREIGN PATENT DOCUMENTS

JP     2000-215643   *  8/2000

* cited by examiner

*Primary Examiner*—George J. Letscher
(74) *Attorney, Agent, or Firm*—Rosenberg, Klein & Lee

(57) ABSTRACT

Turntable runout of an optical disk drive is corrected by the application of at least three skidproof rubber pads affixed to the turntable on a circle and separated by equal angles. The height of each of the skidproof rubber pads is selected to adjust the runout of the turntable at each location. The invention accomplishes the compensation of turntable runout where, traditionally, lathe-turning was required.

5 Claims, 3 Drawing Sheets

TURNTABLE RUNOUT COMPENSATION SYSTEM FOR AN OPTICAL DISK DRIVE

FIELD OF THE INVENTION

The present invention relates to a disk mounting device for optical disk driver, especially to a disk mounting device with skidproof rubber pads, by which the runout of the turn table is reduced.

BACKGROUND OF THE INVENTION

The accessing speed of optical disk driver is rapidly increased as the demand of larger-storage devices is urgent. Recently, the optical disk drivers with 10000 RPM spindle motor speed have become the main stream of the market.

However, the speed increment of the optical disk driver is challenged by several factors such as vibration, noise and runout of turntable thereof. It is important issue to minimize the runout of turntable in a cost effective way.

There are two approaches to reduce runout. First, the turntable is manufactured by turning off brass materials. Second, the turntable is manufactured by plastic injection and then processed by turning off.

However, the above manufactured turntable has high cost either caused by material used or additional process involved.

It is the object of the present invention to provide a disk-mounting device for optical disk driver, which has a novel assembling manner such that the runout of the turn table is reduced.

To achieve the above object, the present invention provides a disk-mounting device for optical disk driver a turntable, at least three skidproof rubber pads arranged on the turntable to compensate runout of the turntable. Before attaching the skidproof rubber pads, the turntable height at three points with equal radius and separated by 120 degrees is measured. The height of the skidproof rubber pads is selected to compensate runout of the turntable. Therefore, the runout of the turntable is reduced in a cost effective manner.

The various objects and advantages of the present invention will be more readily understood from the following detailed description when read in conjunction with the appended drawing, in which:

DETAILED DESCRIPTION OF THE PREFERRED EMBODIMENT

Figure 1:
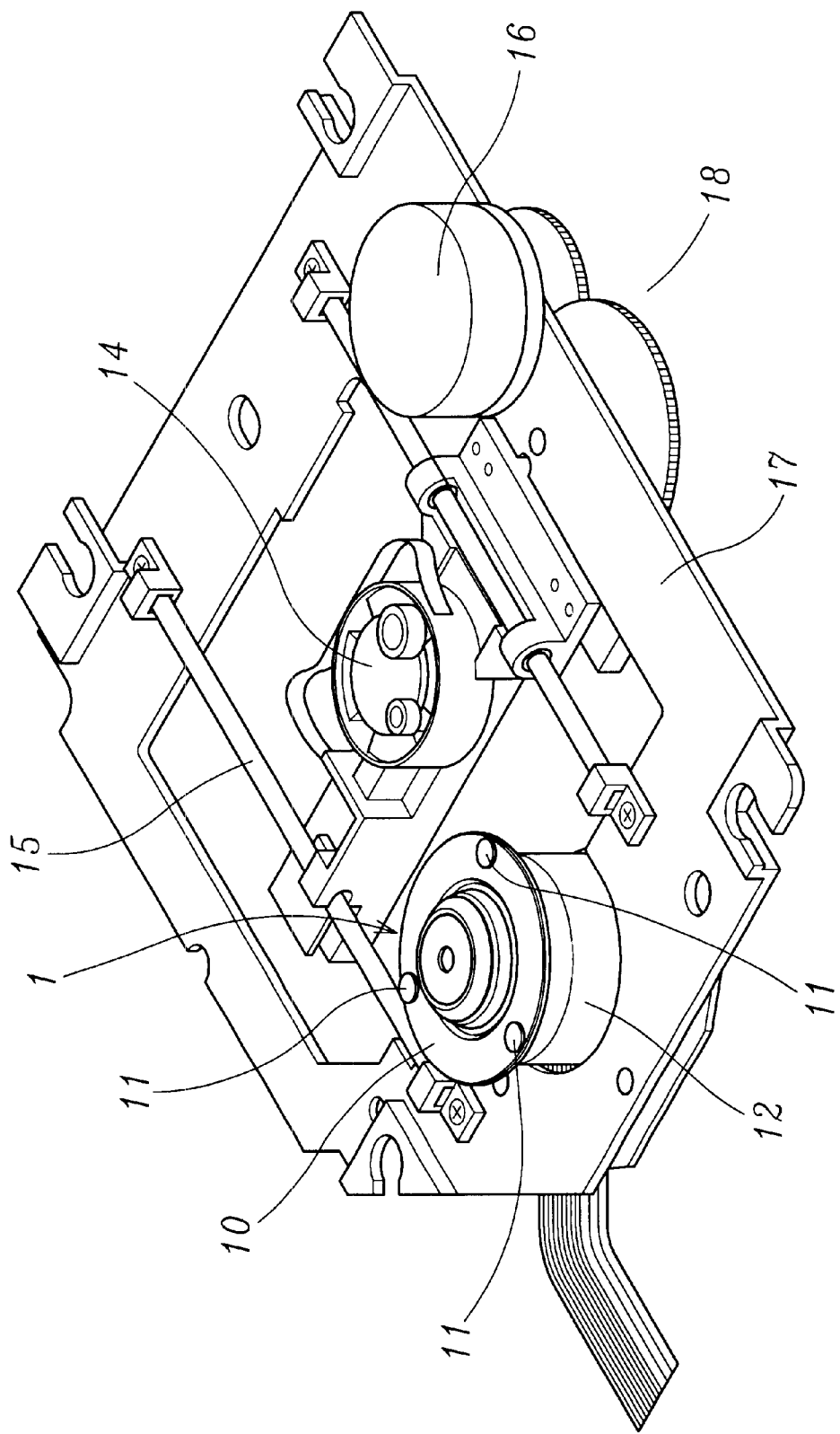
FIG. 1 is the perspective view of the invention.
Figure 2:
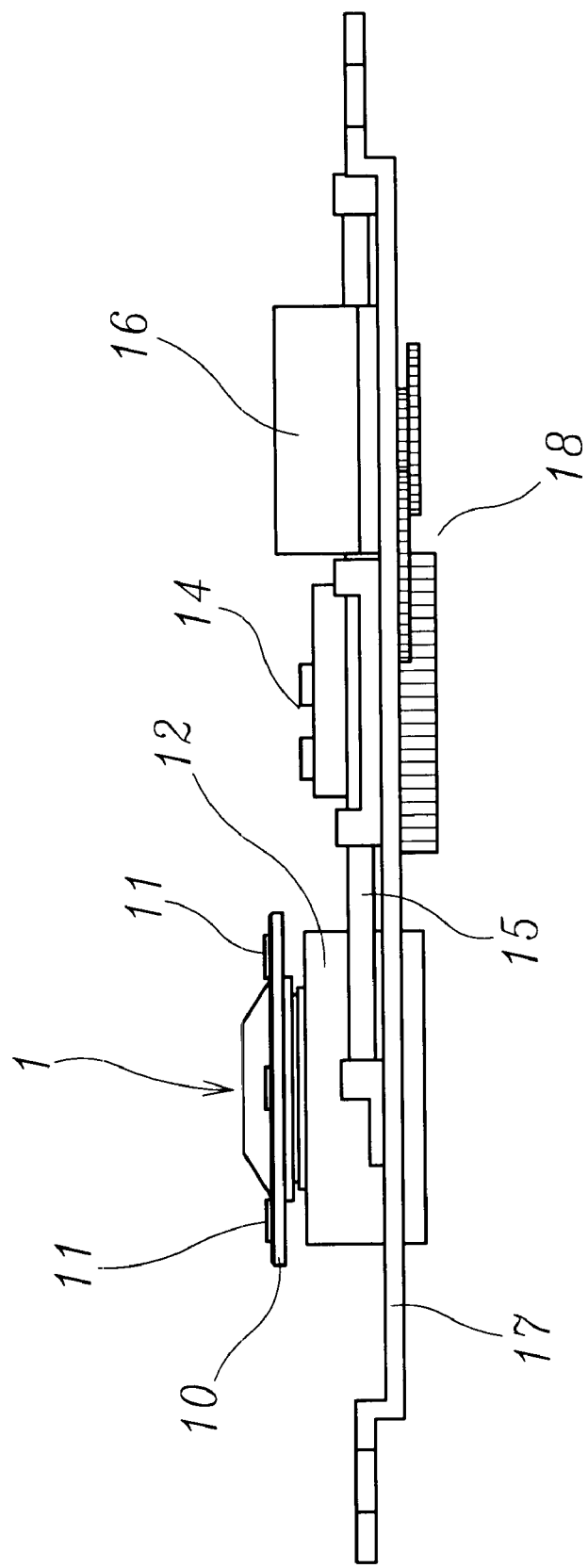
FIG. 2 is the sectional view of the invention.

FIGS. 1 and 2 show the perspective view and sectional view of the present invention. The conventional skidproof means for disk mounting device is generally a skidproof rubber loop on the turntable of the optical disk driver, wherein the rubber loop increases clamping force of clamping means of the optical disk driver.

In the present invention, the disk mounting device 1 is provided with three skidproof rubber pads 11 of circular or other shapes on the turntable 10. The skidproof rubber pads are made of rubber materials with high friction coefficient to enhance clamping effect. In other word, according to the geometric principle that a plane is uniquely determined by three non-collinear points, the conventional rubber loop is replaced by three rubber pads in the present invention. The provision of the rubber pads provides more flexibility in reducing runout. Before attaching the rubber pads, the height variation of the turntable 10 is measured at three points separated by 120 degrees.

Figure 3:
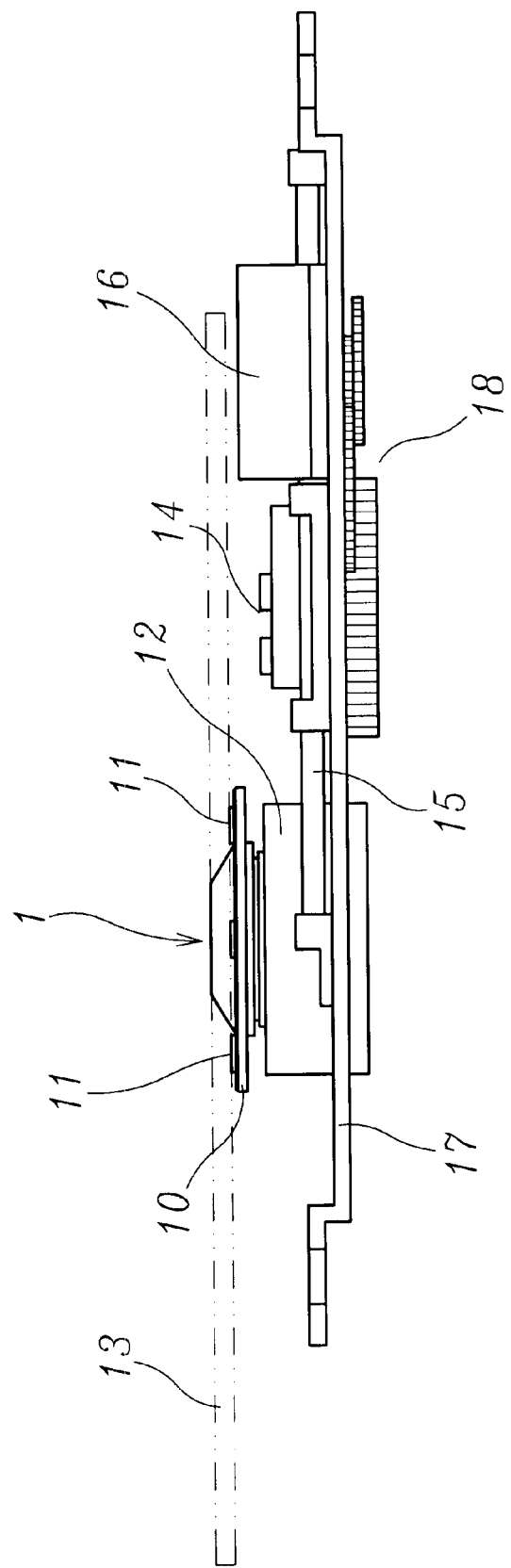
FIG. 3 shows a preferred embodiment of the present invention.

FIG. 3 shows a preferred embodiment of the present invention. The turntable 10 of the optical disk driver is fixed on and driven by a spindle motor 12 arranged on a base 17. An optical pick-up head 14 is arranged beside the turntable 10 and slidably mounted on two guiding shafts 15. The optical pickup head 14 is driven by a motor 16 through a gear means 18 to slide along the two guiding shafts 15. The turntable 10 is driven by the spindle motor 12 to rotate the disk 13, thus achieving the data accessing for the disk 13.

The averaged normalized runout of unadjusted turntable is above 5, the present invention uses following steps to reduce the normalized runout of the turntable to be within 3 by compensation.

1. There are 6 possible values (0, 1, 2, 3, 4, 5) for the normalized height variation of turntable measured at three locations separated by 120 degrees and having equal radius when the maximal normalized runout of unadjusted turntable is 5. Therefore, the combination of normalized height variation at those points is 216 ($6^3$).
2. The combination of normalized height variation required compensation is 78 (36%), the other 138 combination of normalized height variation has values smaller or equal to than 3.
3. To reduce the maximal normalized runout of the turntable to be below 3, the maximal normalized compensation is 2. Therefore, skidproof rubber pads with different thickness corresponding to three different normalized height compensation (0, 1, 2) are prepared.
4. The turntable is attached with three skidproof rubber pads with same thickness at locations separated by 120 degrees and having equal radius when the maximal normalized runout of unadjusted turntable is below 3.
5. The turntable is attached with three skidproof rubber pads with suitable thickness corresponding to required compensated amount at locations separated by 120 degrees and having equal radius when the maximal normalized runout of unadjusted turntable is more than 3.

To sum up, the disk mounting device for optical disk drive has skidproof rubber pads with suitable thickness corresponding to required compensated amount of turntable runout. The conventional cost problem caused by turning off brass materials and processing the mold-injected turntable by turning off is overcome. Therefore, the runout of the turntable is reduced in a cost effective manner.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A turntable runout compensation system for an optical disk drive, said optical disk drive having a turntable driven at a central axis thereof by a spindle motor, the turntable runout compensation system comprising:

a first compensation pad having a first thickness and being affixed to the turntable at a first location corresponding to a maximum value of runout of the turntable, said first thickness selected to reduce said maximum value of runout to a first predetermined value; and a plurality of compensation pads affixed to the turntable at a corresponding plurality of locations on a circle having a radius equal to a distance from the central axis of the turntable to said first location, said locations being spaced apart by equal angles on said circle, each of said plurality of compensation pads having a thickness selected to reduce runout at said corresponding location to within a predetermined value of said first predetermined value, wherein said plurality of compensation pads includes at least a second compensation pad and a third compensation pad.

2. The turntable runout compensation system for an optical disk drive as recited in claim 1, wherein said first compensation pad and said plurality of compensation pads are constructed from rubber.

3. The turntable runout compensation system for an optical disk drive as recited in claim 1, wherein said first compensation pad and said plurality of compensation pads are of a circular shape.

4. The turntable runout compensation system for an optical disk drive as recited in claim 1, wherein said plurality of compensation pads includes only said second compensation pad and said third compensation pad, wherein said first compensation pad, said second compensation pad and said third compensation pad are spaced apart on said circle by 120 degrees.

5. The turntable runout compensation system for an optical disk drive as recited in claim 1, wherein said first compensation pad and said plurality of compensation pads are of equal thickness.

* * * * *